May 19, 1970 C. A. STATHACOPOULOS 3,513,271
TELEPHONE INSTRUMENT HAVING LONG DISTANCE CALL-BLOCKING APPARATUS
Filed Nov. 25, 1966
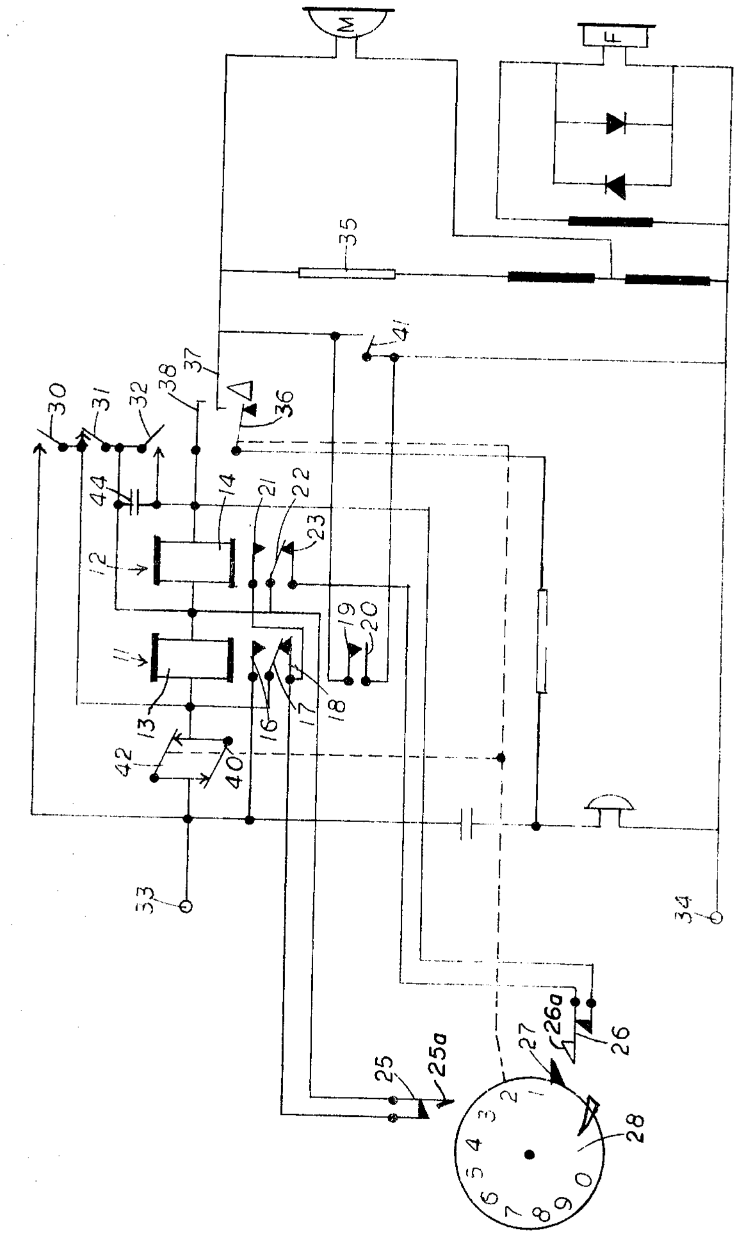
INVENTOR
CHRISTOS A. STATHACOPOULOS
BY Alberts, Brezina & Lund
ATTORNEYS United States Patent Office 3,513,271

Patented May 19, 1970

3,513,271

TELEPHONE INSTRUMENT HAVING LONG DISTANCE CALL-BLOCKING APPARATUS

Christos A. Stathacopoulos, 7 Ioan, Michael St., Thesaloniki, Greece

Filed Nov. 25, 1966, Ser. No. 596,935
Int. Cl. H04m *1/66*
U.S. Cl. 179—189 12 Claims

ABSTRACT OF THE DISCLOSURE

Telephone instrument which may be blocked when desired, as by use of a subscriber's key, to prevent other persons having access to the instrument from making long distance calls, while permitting local calls as well as reception of incoming calls whether local or long distance. An arrangement of relays and dial contacts responds only to initial dialing of a long distance code to prevent transmission of the corresponding signals. Cradle switch enables the circuit when the receiver goes off-hook.

This invention relates to an arrangement which can be incorporated in a telephone instrument or attached to an existing instrument and which blocks the instrument against the transmission of long distance calls therefrom. The arrangement of this invention is comparatively simple and yet is highly effective, reliable and trouble-free in operation.

The arrangement of this invention may be applied to a conventional telephone instrument including a receiver, dial means and signal means controlled by the dial means for signalling local and long distance calls, long distance calls being signalled by initial dialing of a long distance code designation. In many instances, it is desirable that persons having access to the instrument should not be permitted to make long distance calls therefrom, while being free to make local calls as desired. In accordance with this invention, a detector means is provided which is responsive to dialing of a long distance code for developing a control signal and control means are provided operable from an inactive to an active condition in response to the control signal for disabling the signal means against further operation. Switch means are provided controlled by lifting of the receiver for initially rendering the signal means operable and for restoring the control means to the inactive condition thereof when the receiver is put down.

The invention is illustrated as applied to a telephone instrument of the type having a rotatable dial and which is connected in a telephone system wherein long distance calls are initiated by dialing a first digit of "zero." It will be understood, however, that the invention is not necessarily limited to the use of rotatable dial means or to the system in which the long distance call is initiated by dialing of "zero." In accordance with this invention, the control means preferably comprises a first switching means in the form of a relay having contact means for short-circuiting impulse transmitter contacts when the relay is energized. The relay coil, however, is normally maintained in a deenergized condition through switch means which are opened in response to dialing of the long distance code, in this case "zero."

In the event that the long distance code is not initially dialed, it is desirable to insure against operation of the relay in the event that the long distance code is included in the number indicating a local number to be called. In accordance with this invention, a second control means is provided which preferably includes switching means in the form of a relay which is energized in response to dialing of a code rather than a long distance code and which has contacts operable to maintain the first relay in a deenergized condition.

An important feature of the invention relates to the provision of manually operable switch means for controlling operation. Preferably, the manually operable switch means may be controlled through a suitable lock and key so that an authorized person can condition the instrument so that he can make long distance calls therefrom. The manually operable means further may preferably include switch means for completely locking the instrument against operation.

Further important features relate to circuit arrangements by which the arrangement can be readily incorporated in or applied to a telephone instrument and by which highly reliable, effective and trouble-free operation is insured.

This invention contemplates other objects, features and advantages which will become more fully apparent from the following detailed description taken in conjunction with the accompanying drawing wherein the single feature shows a circuit diagram of a telephone instrument incorporating the apparatus constructed according to the invention.

Reference numeral 10 generally designates a telephone instrument which includes elements in circuitry of a conventional nature and which additionally includes a pair of relays 11 and 12 having coils 13 and 14. The relay 11 has contacts 16, 17, 18, 19 and 20. Contact 17 is normally engaged with contact 18 but engages contact 16 upon energization of the coil 13. Contact 20 engages contact 19 upon energization of the coil 13. The relay 12 has contacts 21, 22 and 23, contact 22 being normally engaged with contact 23 but being engaged with contact 21 upon energization of coil 14.

The apparatus further includes a pair of switches 25 and 26 having actuating portions 25*a* and 26*a* in the path of movement of and operated by a device 27 carried by a rotatable dial 28 of the telephone instrument. In addition, switches 30, 31 and 32 are provided, which are preferably arranged for operation by a lock cam device, controlled by a key.

A pair of terminals 33 and 34 are connected to telephone lines leading to a central exchange. By way of example, the exchange may apply a DC voltage of sixty volts between terminals 33 and 34 with an internal or line resistance of 2000 ohms. The resistance of the instrument may be upon the order of 400 ohms, including the resistance of a resistor 35 and other conventional elements of the circuit.

To use the instrument, the receiver is first lifted whereupon a contact 36 engages a contact 37 which, in turn, engages a contact 38. The voltage between terminals 33 and 34 may then be on the order of about 14 volts, while a current of approximately 35 milliamperes may flow.

The dial 28 is then rotated and a switch 40 is open while a switch 41 is closed, switches 40 and 41 and an additional switch 42 being switches normally provided and being operated in conventional fashion by the dial 28, as diagrammatically indicated by dotted lines, for the purpose of generating impulses and for shorting the receiver during dialing. Switches 40 and 41 remain in such positions during the automatic return movement of the dial 28. The contact 42 opens only during the return movement of the dial 28 and operates to transmit a number of impulses to the exchange corresponding to the position to which the dial 28 was moved before its return movement was initiated. After return, switches 40 and 42 are closed while switch 41 is opened.

The coils 13 and 14 of the relays 11 and 12 are in series between switches 40 and 42 and the switch contact 38 and are thus on the path of current flow. However, neither of the relay coils 13 or 14 is initially energized because both are short-circuited, coil 13 being short-circuited through contacts 17 and 18 of the switch 25, and coil 14 being short-circuited through contacts 22 and 23 thereof and the switch 26. If the first digital dial is a "zero," the device 27 engages the switch 25 to open the switch 25 whereupon the short-circuit of the relay coil 13 is removed and the relay coil 13 is energized. Contact 17 then engages the contact 16 to short-circuit the switches 40 and 42 and to prevent the further transmission of signals from the dialing operation. At the same time, contact 17 is disengaged from contact 18 and the relay 13 will not be again deenergized even with switch 25 opened. Accordingly, no calls of any kind can be made from the instrument, until the receiver is put down to open the contacts 37 and 38 and to deenergize the relay 13.

If the first digit dialed is other than a "zero," the switch 25 will not be activated but when upon the return movement of the dial 28, the device 27 engages the switch actuating portion **26*a* to open the switch 26, the short-circuit of the relay coil 14 is removed to permit energization thereof. Contact 22 then engages the contact 21 to short-circuit the switch 25 and to maintain the relay coil 13 in its deenergized condition, so as to prevent energization of the coil 13 even when a subsequent "zero" digit is dialed. Coil 14 is deenergized when the receiver is put down to disengage contacts 37 and 38**.

It is noted that contacts 19 and 20 of the relay 11 are in parallel with the switch 41 to short-circuit the receiver when the relay coil 13 is energized.

It is further noted that a capacitor 44 is provided which delays de-energization of the relay coil 14 to insure that all impulses to be transmitted by the switch 42 will be developed.

As above indicated, the switches 30, 31 and 32 are preferably operated by a locking cam, controlled by the turning of a key. With switches 31 and 32 open, the instrument will be blocked against long distance dial calls, but if switches 31 and 32 are closed, the relay coils 13 and 14 are short-circuited and the instrument can be used for long distance telephone calls as well as local calls. The switch 30 is provided for short-circuiting the impulse transmitter switch 42 when desired, so as to block the instrument against all outgoing calls, while permitting reception of incoming calls.

It will be understood that modifications and variations may be effected without departing from the spirit and scope of the novel concepts of this invention.

I claim as my invention:

1. In a telephone instrument including a receiver dial means, signal means controlled by said dial means for signalling local and long distance calls, long distance calls being signalled by initial dialing of a certain long distance code, first means operable from a first condition to a second condition in response to dialing of said long distance code, second means coupled to said first means and to said signal means and operable from an inactive condition to an active condition in response to operation of said first means to said second condition for disabling said signal means against further operation, and switch means controlled by lifting of said receiver for initially rendering said signal means operable and controlled by replacement of said receiver for restoring said second means to said inactive conditions thereof.

2. In a telephone instrument as defined in claim 1, third means responsive to initial dialing of a code other than said long distance code for maintaining said second means in said inactive condition.

3. In a telephone instrument as defined in claim 1, manually operable switch means movable from a first position to a second position for maintaining said second means in said inactive condition.

4. In a telephone instrument as defined in claim 3, said manually operable switch means having a third position in which it is operable to disable said signal means.

5. In a telephone instrument as defined in claim 1, said second means comprising a relay having a coil and having contacts operable to disable said signal means upon energization of said coil, and said first means including a switch normally closed to short-circuit said coil and means opening said switch in response to dialing of said long distance code to permit energization of said coil.

6. In a telephone instrument as defined in claim 5, said relay having normally closed contacts in series with said coil and said switch of said first means.

7. In a telephone instrument as defined in claim 5, said second means comprising a second relay having a coil and contacts closed upon energization of said coil for short-circuiting said coil of the first relay, and a switch normally closed to short-circuit said coil of said second relay and opened in response to dialing of a code other than said long distance code to permit energization of said coil of said second relay.

8. In a telephone instrument as defined in claim 6, said normally closed contacts of said relay including a common changeover contact movable from one position to another to disable said signal means in response to energization of said coil.

9. In a telephone instrument as defined in claim 7, said contacts of said second relay including a change-over contact normally in a first position wherein it cooperates with said switch of said second means in short-circuiting said coil of said second relay and having a second position in which it operates to short-circuit said switch of said first means.

10. In a telephone instrument as defined in claim 5, said relay having additional contacts operable to short-circuit said receiver when said coil is energized.

11. In a telephone instrument as defined in claim 7, said signal means including in pulse transmitter contacts in series with said coils of said second relay.

12. In a telephone instrument as defined in claim 7, said dial means including a rotatable dial, and means carried by said dial for operating said switches of said first and second means.

References Cited

UNITED STATES PATENTS

| | | |
|---|---|---|
| 3,284,578 | 11/1966 | Evans. |
| 2,593,419 | 4/1952 | Hertog et al. |

KATHLEEN H. CLAFFY, Primary Examiner

T. W. BROWN, Assistant Examiner